(12) United States Patent
Coalson, Jr.

(10) Patent No.: US 10,441,004 B2
(45) Date of Patent: Oct. 15, 2019

(54) SAFETY GARMENT ENSEMBLE

(71) Applicant: John Jackson Coalson, Jr., Boston, VA (US)

(72) Inventor: John Jackson Coalson, Jr., Boston, VA (US)

(*) Notice: Subject to any disclaimer, the term of this patent is extended or adjusted under 35 U.S.C. 154(b) by 117 days.

(21) Appl. No.: 15/590,429

(22) Filed: May 9, 2017

(65) Prior Publication Data
US 2018/0325187 A1 Nov. 15, 2018

(51) Int. Cl.

| | |
|---|---|
| A41D 1/00 | (2018.01) |
| A41D 1/04 | (2006.01) |
| A41D 1/06 | (2006.01) |
| F21V 7/05 | (2006.01) |
| F41H 1/02 | (2006.01) |
| H04N 5/77 | (2006.01) |
| H04R 1/02 | (2006.01) |
| A41D 13/01 | (2006.01) |
| A41D 27/10 | (2006.01) |

(Continued)

(52) U.S. Cl.
CPC .............. *A41D 1/002* (2013.01); *A41D 1/04* (2013.01); *A41D 1/06* (2013.01); *A41D 13/01* (2013.01); *A41D 19/0157* (2013.01); *A41D 19/01594* (2013.01); *A41D 27/10* (2013.01); *A41D 27/205* (2013.01); *A41D 31/08* (2019.02); *A41D 31/245* (2019.02); *F21V 7/05* (2013.01); *F21V 33/0008* (2013.01); *F41H 1/02* (2013.01); *H04N 5/247* (2013.01); *H04R 1/028* (2013.01); *A41D 2600/20* (2013.01); *F21Y 2115/10* (2016.08); *H04N 5/772* (2013.01); *H04R 1/406* (2013.01); *H04R 2201/023* (2013.01)

(58) Field of Classification Search
CPC .. A41D 1/002; A41D 27/205; A41D 19/0157; A41D 19/01594; A41D 27/10; A41D 31/0022; A41D 31/0061; A41D 2600/20; F21V 33/0008; F21V 7/05; F41H 1/02; H04N 5/247; H04N 5/772; H04R 1/028; F21Y 2115/10
USPC ...................................... 2/2.5, 102; 362/103
See application file for complete search history.

(56) References Cited

U.S. PATENT DOCUMENTS

| | | | |
|---|---|---|---|
| 5,416,310 A | * 5/1995 | Little ................. | G06F 1/163 |
| | | | 2/102 |
| 6,175,958 B1 | 1/2001 | Wu | |

(Continued)

FOREIGN PATENT DOCUMENTS

WO   WO-2006118571 A1 * 11/2006 ............. A41D 13/01

*Primary Examiner* — Khoa D Huynh
*Assistant Examiner* — Grace Huang (57) ABSTRACT

A safety garment ensemble for emergency personnel includes a vest that is configured to position on a torso of a user so that the vest is coupled to the user. The vest comprises ballistic textiles and fire resistant textiles so that the vest is both bullet-resistant and fire-retardant. A first power module, a microprocessor, a plurality of microphones, a plurality of cameras, and a data storage module are coupled to the vest. The microprocessor is operationally coupled to the first power module. The microphones, the cameras, and the data storage module are operationally coupled to the microprocessor. The microphones and the camera are configured to capture audio recordings and video recordings, respectively, of events in an area proximate to the vest. The data storage module is positioned to receive and store the audio and visual recordings.

15 Claims, 5 Drawing Sheets

(51) Int. Cl.
*A41D 27/20* (2006.01)
*A41D 31/08* (2019.01)
*A41D 31/24* (2019.01)
*F21V 33/00* (2006.01)
*H04N 5/247* (2006.01)
*A41D 19/015* (2006.01)
*F21Y 115/10* (2016.01)
*H04R 1/40* (2006.01)

(56) References Cited

U.S. PATENT DOCUMENTS

| | | | |
|---|---|---|---|
| 6,267,482 | B1 | 7/2001 | Miller et al. |
| D457,273 | S | 5/2002 | Griffiths |
| 6,976,274 | B1* | 12/2005 | Dufresne ......... A41D 19/01535 |
| | | | 2/161.6 |
| 8,107,653 | B2* | 1/2012 | Wolfe .................. A41D 1/002 |
| | | | 381/301 |
| 8,250,671 | B2* | 8/2012 | Shadid ............... A41D 13/0012 |
| | | | 2/94 |
| 8,945,328 | B2* | 2/2015 | Longinotti-Buitoni ..................... |
| | | | A61B 5/0002 |
| | | | 156/234 |
| 9,511,877 | B2* | 12/2016 | Masson .................. B64D 43/00 |
| 2012/0167288 | A1 | 7/2012 | Chen et al. |
| 2014/0130225 | A1 | 5/2014 | Balzano |
| 2016/0073699 | A1* | 3/2016 | Drapela .............. H01M 2/1022 |
| | | | 345/156 |
| 2017/0143053 | A1* | 5/2017 | Wright .................. A41D 13/01 |
| 2017/0225032 | A1* | 8/2017 | Jones .................. A41D 1/002 |
| 2017/0274249 | A1* | 9/2017 | Moebius .......... A63B 21/00845 |
| 2017/0350585 | A1* | 12/2017 | Salazar David ... H05B 33/0845 |
| 2017/0360122 | A1* | 12/2017 | Chin ...................... A41D 1/002 |
| 2018/0005503 | A1* | 1/2018 | Kaindl .................. G08G 1/166 |

\* cited by examiner

SAFETY GARMENT ENSEMBLE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to garment ensembles and more particularly pertains to a new garment ensemble for emergency personnel.

BRIEF SUMMARY OF THE INVENTION

An embodiment of the disclosure meets the needs presented above by generally comprising a vest that is configured to position on a torso of a user so that the vest is coupled to the user. The vest comprises ballistic textiles and fire resistant textiles so that the vest is both bullet-resistant and fire-retardant. A first power module, a microprocessor, a plurality of microphones, a plurality of cameras, and a data storage module are coupled to the vest. The microprocessor is operationally coupled to the first power module. The microphones, the cameras, and the data storage module are operationally coupled to the microprocessor. The microphones and the camera are configured to capture audio recordings and video recordings, respectively, of events in an area proximate to the vest. The data storage module is positioned to receive and store the audio and visual recordings.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
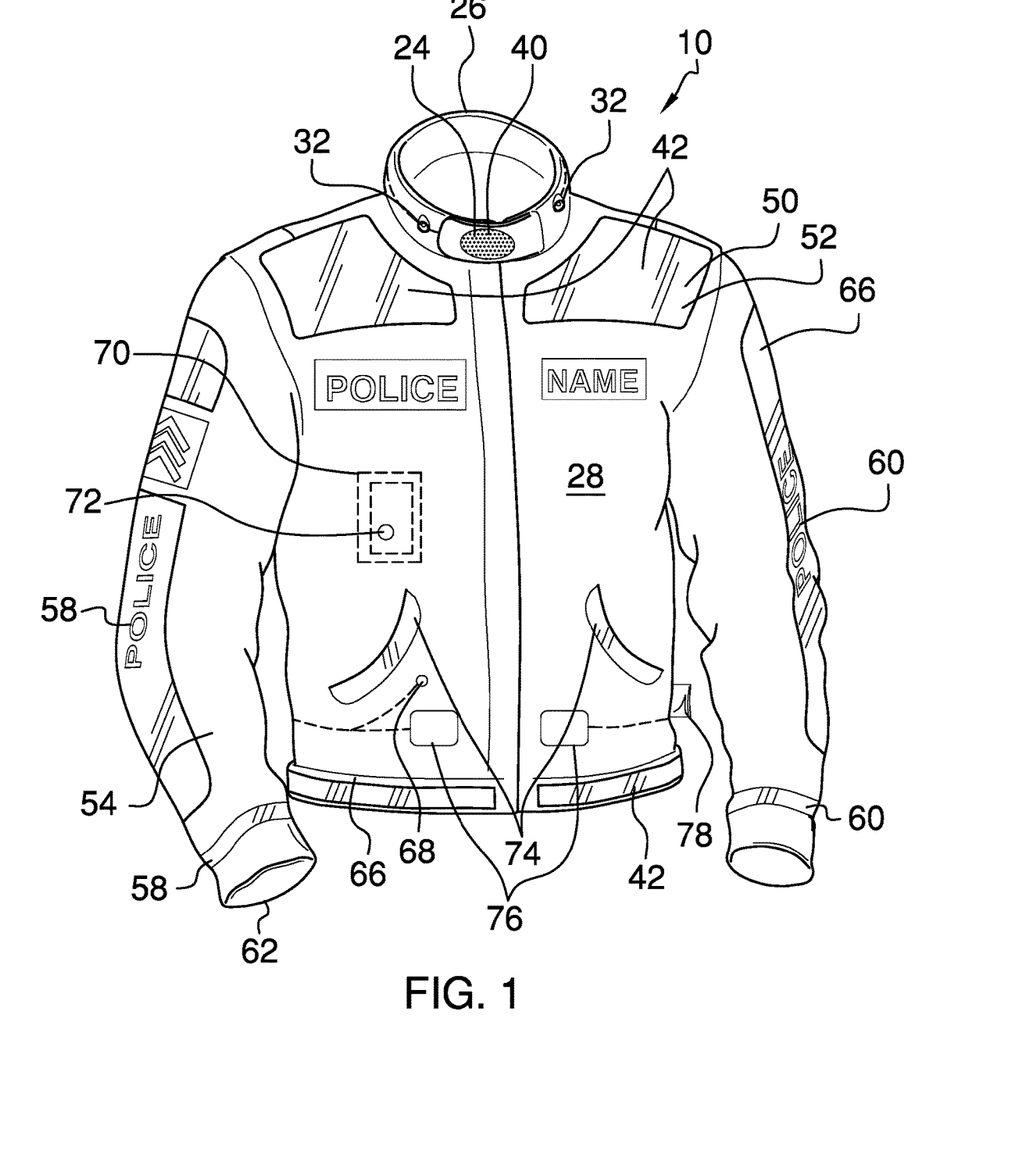
FIG. 1 is a front view of a safety garment ensemble according to an embodiment of the disclosure.
Figure 2:
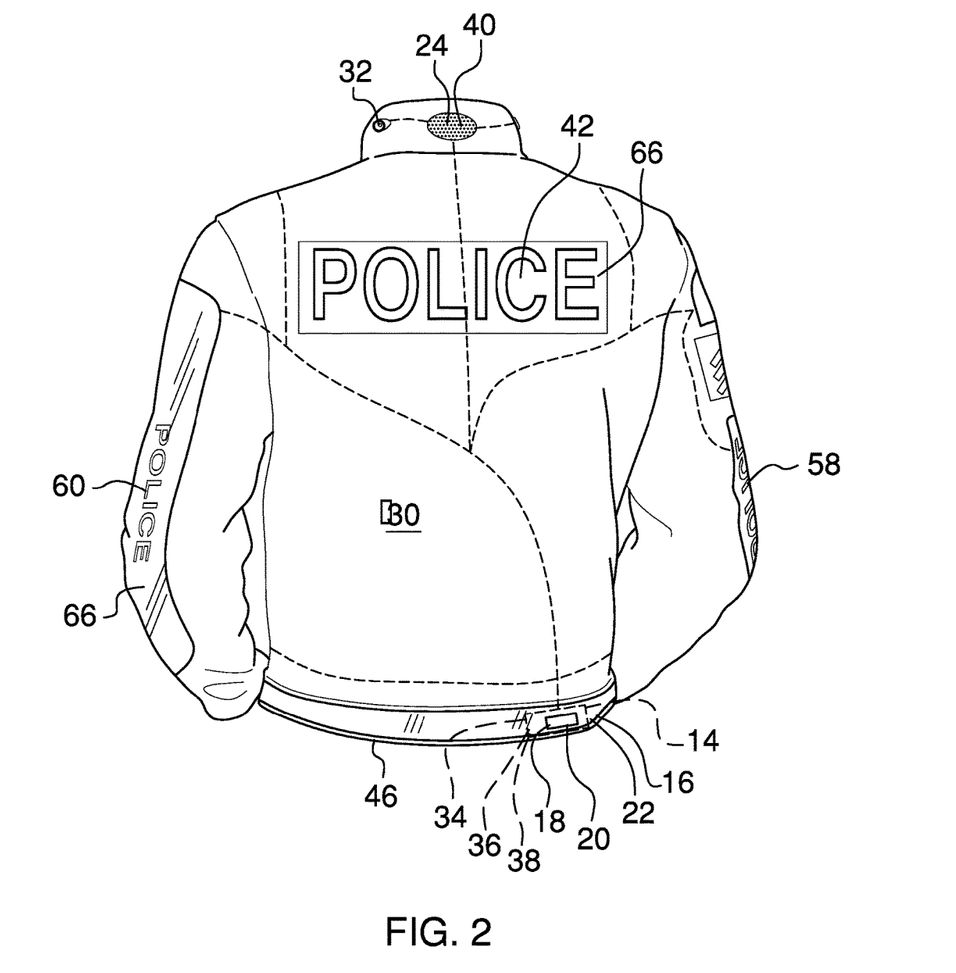
FIG. 2 is a back view of an embodiment of the disclosure.
Figures 3, 4:
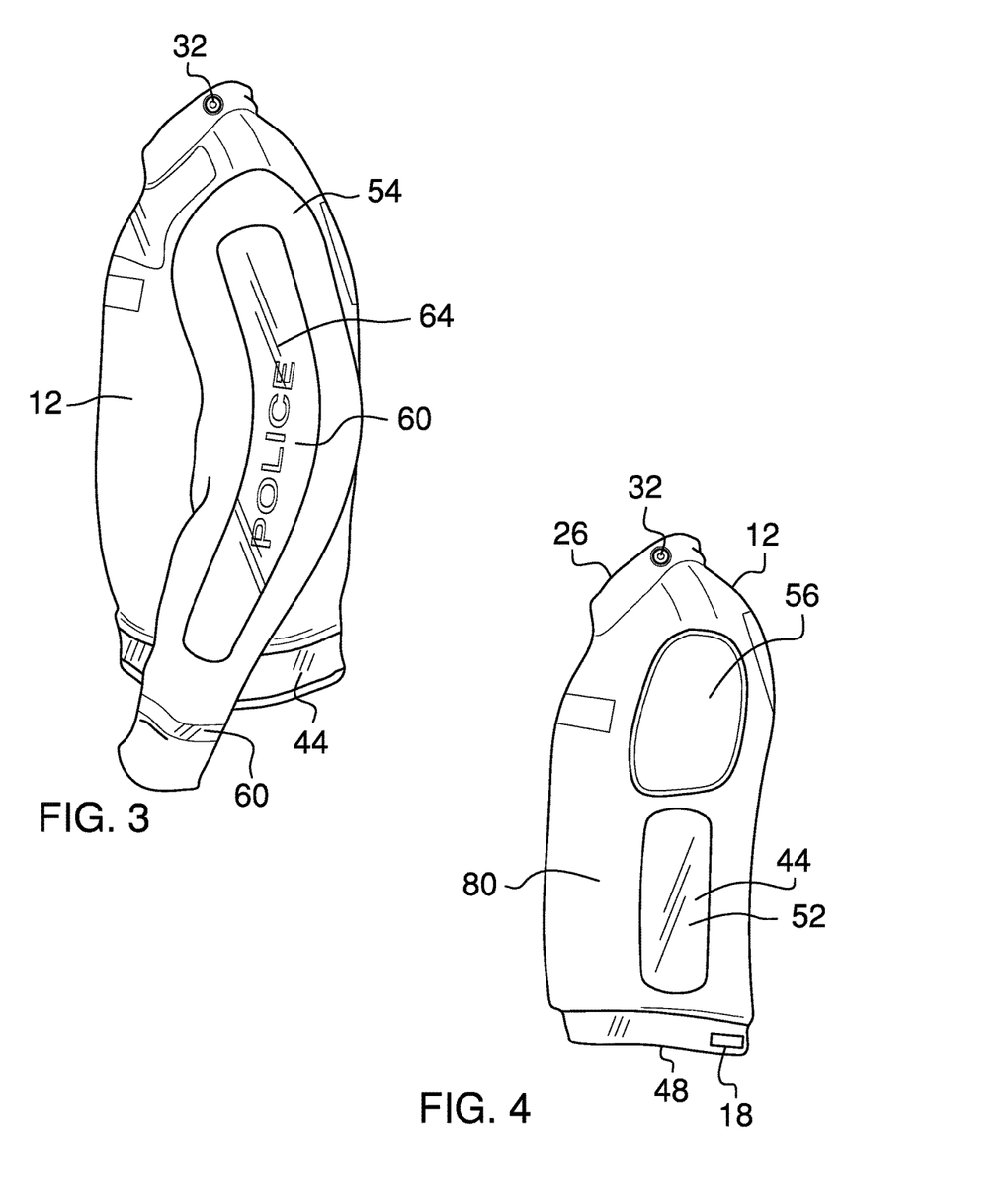
FIG. 3 is a side view of an embodiment of the disclosure.
FIG. 4 is a side view of an embodiment of the disclosure.
Figure 5:
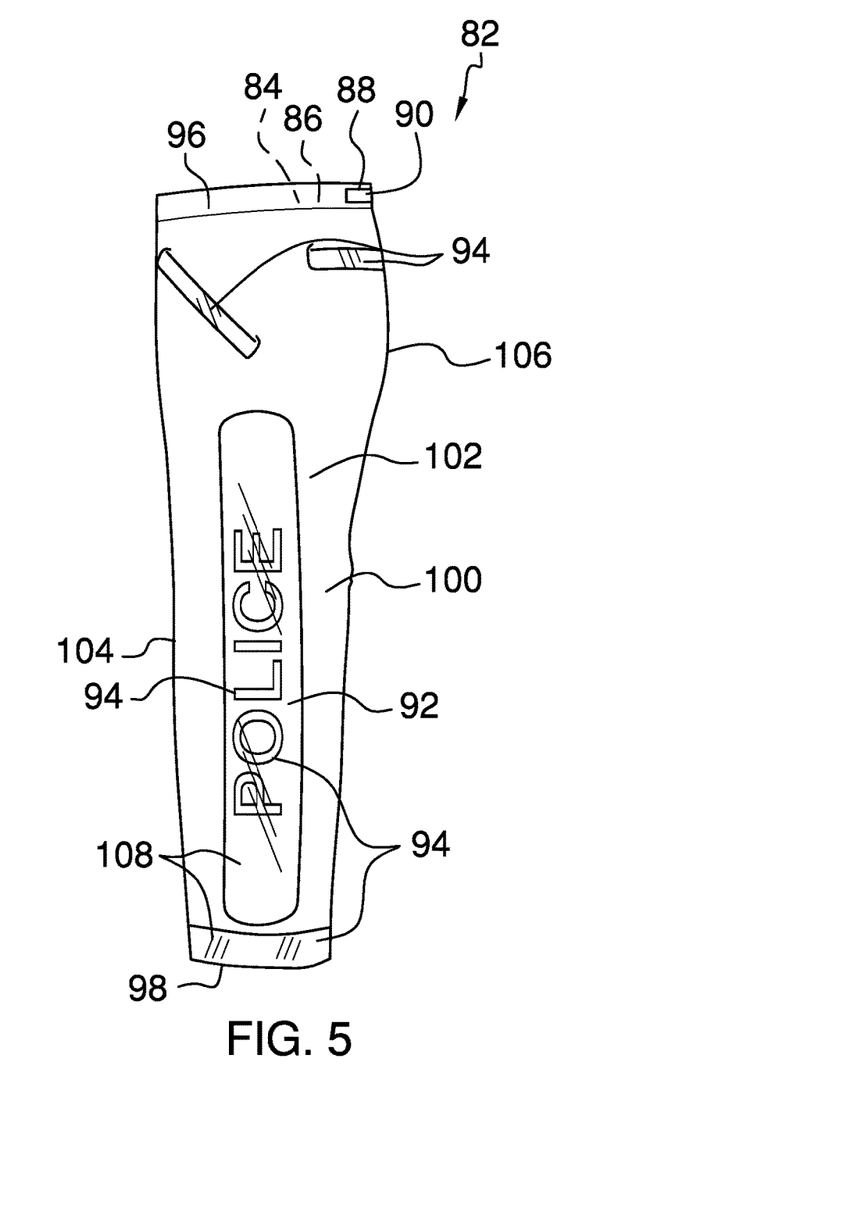
FIG. 5 is a side view of an embodiment of the disclosure.
Figure 6:
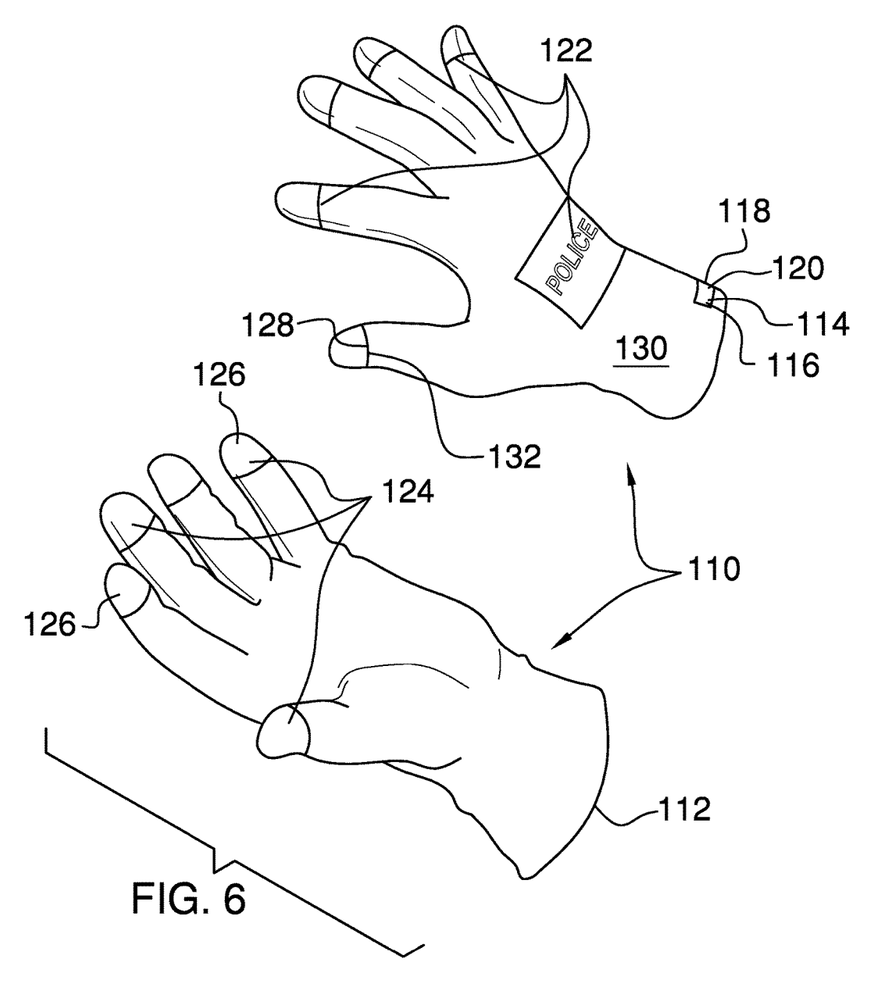
FIG. 6 is an isometric perspective view of an embodiment of the disclosure.

With reference now to the drawings, and in particular to FIGS. 1 through 6 thereof, a new garment ensemble embodying the principles and concepts of an embodiment of the disclosure and generally designated by the reference numeral 10 will be described.

As best illustrated in FIGS. 1 through 6, the safety garment ensemble 10 generally comprises a vest 12 that is configured to position on a torso of a user so that the vest 12 is coupled to the user. The vest 12 comprises ballistic textiles and fire resistant textiles. The vest 12 is both bullet-resistant and fire-retardant.

A first power module 14 is coupled to the vest 12. In one embodiment, the first power module 14 comprises at least one first battery 16. In another embodiment, the at least one first battery 16 is rechargeable.

A first port 18 is coupled to the vest 12 proximate to the at least one first battery 16. The first port 18 is operationally coupled to the at least one first battery 16. The first port 18 is configured to recharge the at least one first battery 16. In one embodiment, the first port 18 comprises a first universal serial bus port 20. In another embodiment, the first universal serial bus port 20 is fast-charging.

A microprocessor 22 is coupled to the vest 12. The microprocessor 22 is operationally coupled to the first power module 14.

A plurality of microphones 24 is coupled to the vest 12. The microphones 24 are operationally coupled to the microprocessor 22. The microphones 24 are configured to capture audio recordings of events in an area proximate to the vest 12. In one embodiment, the plurality of microphones 24 is positioned on a collar 26 of the vest 12. In another embodiment, the plurality of microphones 24 comprises two microphones 24 that are positioned singly on a front 28 and a back 30 of the vest 12.

A plurality of cameras 32 is coupled to the vest 12. The cameras 32 are operationally coupled to the microprocessor 22. The cameras 32 are configured to capture video recordings of events in the area proximate to the vest 12. In one embodiment, the plurality of cameras 32 is positioned on the collar 26 of the vest 12. In another embodiment, the plurality of cameras 32 comprises four cameras 32 that are substantially evenly distributed around the collar 26.

A data storage module 34 is coupled to the vest 12. The data storage module 34 is operationally coupled to the microprocessor 22. The data storage module 34 is positioned to receive and to store the audio and visual recordings.

A transceiver 36 is coupled to the vest 12. The transceiver 36 is operationally coupled to the microprocessor 22. The transceiver 36 is configured to send the audio and visual recordings to one or more recipients. The transceiver 36 also is positioned to receive an audio signal and to relay the audio signal to the microprocessor 22.

A receiver 38 is coupled to the vest 12. The receiver 38 is global positioning system enabled. The receiver 38 is operationally coupled to the microprocessor 22. The receiver 38 is configured to receive coordinates of the user and to relay the coordinates to the microprocessor 22. The microprocessor 22 is positioned to compel the transceiver 36 to send the coordinates of the user to the one or more recipients.

A plurality of speakers 40 is coupled to the vest 12. The speakers 40 are operationally coupled to the microprocessor 22. The speakers 40 are configured to broadcast the audio signal relayed by the microprocessor 22 from the transceiver 36 to the area proximate to the vest 12. In one embodiment, the plurality of speakers 40 is positioned on the collar 26 of the vest 12. In another embodiment, the plurality of speakers 40 comprises two speakers 40 that are positioned singly on the front 28 and the back 30 of the vest 12.

A plurality of first lights 42 is coupled to the vest 12. The first lights 42 are operationally coupled to the microprocessor 22. The first lights 42 are configured to increase visibility of the user to persons proximate to the user. In one embodiment, the plurality of first lights 42 comprises a plurality of sets of first light emitting diodes 44. In another embodiment, the plurality of sets of first light emitting diodes 44 comprises:

i. a set of first light emitting diodes 44 that is positioned proximate to a perimeter 46 of a bottom 48 of the vest 12, ii. two sets of first light emitting diodes 44 that are positioned singly proximate to each front shoulder 50 of the vest 12, and iii. a set of first light emitting diodes 44 that is positioned on the back 30 of the vest 12 and which is configured in script, such as POLICE and FIRE.

In one embodiment, the vest 12 comprises a plurality of first panels 52. The first panels 52 are reflective. Each first panel 52 is coupled to the vest 12 so that the first panel 52 is positioned between a respective set of first light emitting diodes 44 and the vest 12. The first panels 52 are configured to increase the visibility of the user to the persons proximate to the user.

In one embodiment, each of a pair of sleeves 54 is coupled to and extends from a respective arm hole 56 of the vest 12. The sleeves 54 are configured to insert arms of the user.

A plurality of second lights 58 is coupled to the sleeves 54. The second lights 58 are operationally coupled to the microprocessor 22. The second lights 58 are configured to increase the visibility of the user to the persons proximate to the user. In another embodiment, the plurality of second lights 58 comprises a plurality of sets of second light emitting diodes 60. In yet another embodiment, the plurality of sets of second light emitting diodes 60 comprises:

i. two sets of second light emitting diodes 60 that are positioned singly proximate to each respective cuff 62 of the sleeves 54, and ii. two sets of second light emitting diodes 60 that are positioned singly on each respective outer surface 64 of the sleeves 54.

In one embodiment, the sleeves 54 comprise a plurality of second panels 66. The second panels 66 are reflective. Each second panel 66 is coupled to a respective sleeve 54 so that the second panel 66 is positioned between a respective set of second light emitting diodes 60 and the respective sleeve 54. The second panels 66 are configured to increase the visibility of the user to the persons proximate to the user.

A switch 68 is coupled to the front 28 of the vest 12. The switch 68 is operationally coupled to the first power module 14 and the microprocessor 22. The switch 68 is configured to be manipulated by the user to selectively couple the microprocessor 22 to the first power module 14.

A first pocket 70 is positioned on the front 28 of the vest 12. The first pocket 70 is configured to position a taser. A hole 72 is positioned in the first pocket 70. The hole 72 is configured to insert a push button of the taser that is positioned in the first pocket 70.

Each of a pair of second pockets 74 is positioned on the front 28 proximate to the bottom 48 of the vest 12. The second pockets 74 are configured to stow items and insert hands of the user.

A pair of buttons 76 is coupled singly proximate to the second pockets 74. Each button 76 is operationally coupled to the microprocessor 22 and the first power module 14. Each button 76 is configured to be depressed to compel the microprocessor 22 to intermittently activate the plurality of first lights 42 and the plurality of second lights 58 so that the first lights 42 and second lights 58 strobe.

A coupler 78 is coupled to the vest 12. The coupler 78 is configured to reversibly couple to a nightstick. In one embodiment, the coupler 78 is positioned on a respective side 80 of the vest 12 proximate to the bottom 48 of the vest 12.

In one embodiment, the ensemble 10 comprises a pair of pants 82 that is complementary to the vest 12. The pants 82 are configured to position on and couple to the user. The pants 82 extend from the bottom 48 of the vest 12 to proximate to ankles of the user.

A second power module 84 is coupled to the pants 82 proximate to a waistband 96 of the pants 82. In one embodiment, the second power module 84 comprises at least one second battery 86. In another embodiment, the at least one second battery 86 is rechargeable.

A second port 88 is coupled to the pants 82 proximate to the at least one second battery 86. The second port 88 is operationally coupled to the at least one second battery 86. The second port 88 is configured to recharge the at least one second battery 86. In one embodiment, the second port 88 comprises a second universal serial bus port 90. In another embodiment, the second universal serial bus port 90 is fast-charging.

A plurality of third lights 92 are coupled to the pants 82. The third lights 92 are configured to increase the visibility of the user to the persons proximate to the user. In one embodiment, the plurality of third lights 92 comprises a plurality of sets of third light emitting diodes 94. In another embodiment, the plurality of sets of third light emitting diodes 94 comprises:

i. two sets of third light emitting diodes 94 that are positioned singly proximate to each respective bottom edge 98 of legs 100 of the pants 82, ii. two sets of third light emitting diodes 94 that are positioned singly on each respective outer face 102 of the legs 100 and which are configured in script, such as POLICE and FIRE, iii. two sets of third light emitting diodes 94 that are positioned singly on a front face 104 of the pants 82 and which extend from proximate to the waistband 96 toward a respective outer face 102, and     iv. a set of third light emitting diodes 94 that is positioned on a backside 106 of the pants 82 proximate to the waistband 96.

In one embodiment, the pants 82 comprise a plurality of third panels 108. The third panels 108 are reflective. Each third panel 108 is coupled to the pants 82 so that the third panel 108 is positioned between a respective set of third light emitting diodes 94 and the pants 82. The third panels 108 are configured to increase the visibility of the user to the persons proximate to the user.

In one embodiment, the ensemble 10 comprises a pair of gloves 110 that is complementary to the vest 12. Each glove 110 has an opening 112 so that the gloves 110 are configured to position singly on and couple to the hands of the user. The gloves 110 substantially cover the hands of the user.

A pair of third power modules 114 is coupled singly to the pair of gloves 110 proximate to the openings 112. In one embodiment, each third power module 114 comprises at least one third battery 116. In another embodiment, the at least one third battery 116 is rechargeable.

Each of a pair of third ports 118 is coupled to a respective glove 110 proximate to the at least one third battery 116. The third port 118 is operationally coupled to the at least one third battery 116. The third port 118 is configured to recharge the at least one third battery 116. In one embodiment, the third port 118 comprises a third universal serial bus port 120. In another embodiment, the third universal serial bus port 120 is fast-charging.

A plurality of fourth lights 122 is coupled to the gloves 110. The fourth lights 122 are configured to increase the visibility of the user to the persons proximate to the user. In one embodiment, the plurality of fourth lights 122 comprises a plurality of sets of fourth light emitting diodes 124. In another embodiment, the plurality of sets of fourth light emitting diodes 124 comprises:

i. sets of fourth light emitting diodes 124 that are positioned singly proximate to ends of each digit tube 126 and each thumb tube 128 of the gloves 110, and     ii. two sets of fourth light emitting diodes 124 that are positioned singly on each respective upper face 130 of the gloves 110 and which are configured in script, such as POLICE and FIRE.

In one embodiment, the gloves 110 comprise a plurality of fourth panels 132. The fourth panels 132 are reflective. Each fourth panel 132 is coupled to a respective glove 110 so that the fourth panel 132 is positioned between a respective set of fourth light emitting diodes 124 and the respective glove 110. The fourth panels 132 are configured to increase the visibility of the user to the persons proximate to the user.

In use, the microphones 24 are configured to capture audio recordings of events in the area proximate to the vest 12. The cameras 32 are configured to capture video recordings of events in the area proximate to the vest 12. The data storage module 34 is positioned to receive and store the audio and visual recordings. The transceiver 36 is configured to send the audio and visual recordings to the one or more recipients. The transceiver 36 is positioned to receive the audio signal and to relay the audio signal to the microprocessor 22. The receiver 38 is configured to receive the coordinates of the user and to relay the coordinates to the microprocessor 22. The microprocessor 22 is positioned to compel the transceiver 36 to send the coordinates of the user to the one or more recipients. The speakers 40 are configured to broadcast the audio signal, which is relayed by the microprocessor 22 from the transceiver 36, to the area proximate to the vest 12. The first lights 42, the second lights 58, and the third lights 92 are configured to increase the visibility of the user to the persons proximate to the user.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A safety garment ensemble comprising:
   a vest configured for positioning on a torso of a user such that said vest is configured to couple to
   the user, said vest comprising ballistic textiles and fire resistant textiles such that said vest is bullet-resistant and fire-retardant;
   a first power module coupled to said vest;
   a microprocessor coupled to said vest, said microprocessor being operationally coupled to said first power module;
   a plurality of microphones coupled to said vest, said microphones being operationally coupled to said microprocessor;
   a plurality of cameras coupled to said vest, said cameras being operationally coupled to said microprocessor;
   a data storage module coupled to said vest, said data storage module being operationally coupled to said microprocessor; and
   wherein said microphones are positioned on said vest such that said microphones are configured for capturing audio recordings of events in an area proximate to said vest, wherein said cameras are
   a pair of second pockets positioned on a front proximate to a bottom of said vest, wherein said second pockets are positioned on said vest such that said second pockets are configured for stowing items and inserting hands of the user;
   a pair of buttons coupled singly proximate to said second pockets, each said button being operationally coupled to said microprocessor and said first power module, wherein said buttons are positioned on said vest such that each said button is configured for depressing for compelling said microprocessor for intermittently activating said plurality of first lights and said plurality of second lights for strobing.

2. The ensemble of claim 1, further including said first power module comprising at least one first battery, said at least one first battery being rechargeable.

3. The ensemble of claim 2, further including a first port coupled to said vest proximate to said at least one first battery, said first port being operationally coupled to said at least one first battery, wherein said first port is positioned on said vest such that said first port is configured for recharging said at least one first battery, said first port comprising a first universal serial bus port, said first universal serial bus port being fast-charging.

4. The ensemble of claim 1, further comprising:
said plurality of microphones being positioned on a collar of said vest, said plurality of microphones comprising two said microphones positioned singly on a front and a back of said vest; and
said plurality of cameras being positioned on said collar of said vest, said plurality of cameras comprising four said cameras evenly distributed around said collar.

5. The ensemble of claim 1, further including a transceiver coupled to said vest, said transceiver being operationally coupled to said microprocessor, wherein said transceiver is positioned on said vest such that said transceiver is configured for sending the audio and visual recordings to one or more recipients, and wherein said transceiver is positioned for receiving an audio signal and relaying the audio signal to said microprocessor.

6. The ensemble of claim 5, further including a receiver coupled to said vest, said receiver being global positioning system enabled, said receiver being operationally coupled to said microprocessor, wherein said receiver is positioned on said vest such that said receiver is configured for receiving coordinates of the user and relaying the coordinates to said microprocessor, wherein said microprocessor is positioned for compelling said transceiver for sending the coordinates of the user to the one or more recipients.

7. The ensemble of claim 5, further including a plurality of speakers coupled to said vest, said speakers being operationally coupled to said microprocessor, wherein said speakers are positioned on said vest such that said speakers are configured for broadcasting the audio signal relayed by said microprocessor from said transceiver to the area proximate to said vest, said plurality of speakers being positioned on a collar of said vest, said plurality of speakers comprising two said speakers positioned singly on a front and a back of said vest.

8. The ensemble of claim 1, further including wherein said first lights are positioned on said vest such that said first lights are configured for increasing visibility of the user to persons proximate to the user, said plurality of first lights comprising a plurality of sets of first light emitting diodes, said plurality of sets of first light emitting diodes comprising a set of first light emitting diodes positioned proximate to a perimeter of a bottom of said vest, two sets of first light emitting diodes positioned singly proximate to each front shoulder of said vest, and a set of first light emitting diodes positioned on a back of said vest configured in script.

9. The ensemble of claim 8, further including a plurality of first panels, said first panels being reflective, each said first panel being coupled to said vest such that said first panel is positioned between a respective said set of first light emitting diodes and said vest, wherein said first panels are positioned on said vest such that said first panels are configured for increasing the visibility of the user to persons proximate to the user.

10. The ensemble of claim 1, further including a switch coupled to a front of said vest, said switch being operationally coupled to said first power module and said microprocessor, wherein said switch is positioned on said vest such that said switch is configured for manipulating by the user for selectively coupling said microprocessor to said first power module.

11. The ensemble of claim 1, further comprising:
a first pocket positioned on a front of said vest, said first pocket being configured for positioning a taser;
a hole positioned in said first pocket; and
wherein said hole is positioned in said first pocket such that said hole is configured for inserting a push button of the taser positioned in said first pocket.

12. The ensemble of claim 1, further including a coupler coupled to said vest, said coupler being configured for reversibly coupling to a nightstick, said coupler being positioned on a respective side of said vest proximate to said bottom of said vest.

13. The ensemble of claim 1, further comprising:
a pair of pants complementary to said vest, said pants being configured for positioning on and coupling to the user such that said pants extend from a bottom of said vest to proximate to ankles of the user;
a second power module coupled to said pants proximate to a waistband of said pants, said second power module comprising at least one second battery, said at least one second battery being rechargeable;
a second port coupled to said pants proximate to said at least one second battery, said second port being operationally coupled to said at least one second battery, wherein said second port is positioned on said pants such that said second port is configured for recharging said at least one second battery, said second port comprising a second universal serial bus port, said second universal serial bus port being fast-charging;
a plurality of third lights coupled to said pants, wherein said third lights are positioned on said pants such that said third lights are configured for increasing the visibility of the user to persons proximate to the user, said plurality of third lights comprising a plurality of sets of third light emitting diodes, said plurality of sets of third light emitting diodes comprising two sets of third light emitting diodes positioned singly proximate to each respective bottom edge of legs of said pants, two sets of third light emitting diodes positioned singly on each respective outer face of said legs configured in script, two sets of third light emitting diodes positioned singly on a front face of said pants and extending from proximate to said waistband toward a respective said outer face, and a set of third emitting diodes positioned on a backside of said pants proximate to said waistband; and
a plurality of third panels, said third panels being reflective, each said third panel being coupled to said pants such that said third panel is positioned between a respective said set of third light emitting diodes and said pants, wherein said third panels are positioned on said pants such that said third panels are configured for increasing the visibility of the user to persons proximate to the user.

14. A safety garment ensemble comprising:
a vest configured for positioning on a torso of a user such that said vest is configured to couple to the user, said vest comprising ballistic textiles and fire resistant textiles such that said vest is bullet-resistant and fire-retardant;
a first power module coupled to said vest;
a microprocessor coupled to said vest, said microprocessor being operationally coupled to said first power module;
a plurality of microphones coupled to said vest, said microphones being operationally coupled to said microprocessor;

a plurality of cameras coupled to said vest, said cameras being operationally coupled to said microprocessor;

a data storage module coupled to said vest, said data storage module being operationally coupled to said microprocessor; and wherein said microphones are positioned on said vest such that said microphones are configured for capturing audio recordings of events in an area proximate to said vest, wherein said cameras are positioned on said vest such that said cameras are configured for capturing video recordings of events in the area proximate to said vest, wherein said data storage module is positioned on said vest such that said data storage module is positioned for receiving and storing the audio and visual recordings;

a plurality of first lights coupled to said vest, said first lights being operationally coupled to said microprocessor;

a pair of sleeves, each said sleeve being coupled to and extending from a respective arm hole of said vest, wherein said sleeves are positioned on said vest such that said sleeves are configured for inserting arms of the user;

a plurality of second lights coupled to said sleeves, said second lights being operationally coupled to said microprocessor, wherein said second lights are positioned on said sleeves such that said second lights are configured for increasing the visibility of the user to persons proximate to the user, said plurality of second lights comprising a plurality of sets of second light emitting diodes, said plurality of sets of second light emitting diodes comprising two sets of second light emitting diodes positioned singly proximate to each respective cuff of said sleeves, and two sets of second light emitting diodes positioned singly on each respective outer surface of said sleeves;

a plurality of second panels, said second panels being reflective, each said second panel being coupled to a respective said sleeve such that said second panel is positioned between a respective said set of second light emitting diodes and said respective said sleeve, wherein said second panels are positioned on said sleeves such that said second panels are configured for increasing the visibility of the user to persons proximate to the user;

positioned on said vest such that said cameras are configured for capturing video recordings of events in the area proximate to said vest, wherein said data storage module is positioned on said vest such that said data storage module is positioned for receiving and storing the audio and visual recordings;

a pair of gloves complementary to said vest, each said glove having an opening such that said gloves are configured for positioning singly on and coupling to the hands of the user such that said gloves cover the hands of the user;

a pair of third power modules coupled singly to said pair of gloves proximate to said openings, each said third power module comprising at least one third battery, said at least one third battery being rechargeable;

a pair of third ports, each said third port being coupled to a respective said glove proximate to said at least one third battery, said third port being operationally coupled to said at least one third battery, wherein said third port is positioned on said respective said glove such that said third port is configured for recharging said at least one third battery, said third port comprising a third universal serial bus port, said third universal serial bus port being fast-charging;

a plurality of fourth lights coupled to said gloves, wherein said fourth lights are positioned on said gloves such that said fourth lights are configured for increasing the visibility of the user to persons proximate to the user, said plurality of fourth lights comprising a plurality of sets of fourth light emitting diodes, said plurality of sets of fourth light emitting diodes comprising sets of fourth light emitting diodes positioned singly proximate to ends of each digit tube and each thumb tube of each said glove, and two sets of fourth light emitting diodes positioned singly on each respective upper face of said gloves configured in script;

and a plurality of fourth panels, said fourth panels being reflective, each said fourth panel being coupled to a respective said glove such that said fourth panel is positioned between a respective said set of fourth light emitting diodes and said respective said glove, wherein said fourth panels are positioned on said gloves such that said fourth panels are configured for increasing the visibility of the user to persons proximate to the user.

15. A safety garment ensemble comprising:

a vest configured for positioning on a torso of a user such that said vest is configured to coupled to the user, said vest comprising ballistic textiles and fire resistant textiles such that said vest is bullet-resistant and fire-retardant;

a first power module coupled to said vest, said first power module comprising at least one first battery, said at least one first battery being rechargeable;

a first port coupled to said vest proximate to said at least one first battery, said first port being operationally coupled to said at least one first battery, wherein said first port is positioned on said vest such that said first port is configured for recharging said at least one first battery, said first port comprising a first universal serial bus port, said first universal serial bus port being fast-charging;

a microprocessor coupled to said vest, said microprocessor being operationally coupled to said first power module;

a plurality of microphones coupled to said vest, said microphones being operationally coupled to said microprocessor, wherein said microphones are positioned on said vest such that said microphones are configured for capturing audio recordings of events in an area proximate to said vest, said plurality of microphones being positioned on a collar of said vest, said plurality of microphones comprising two said microphones positioned singly on a front and a back of said vest;

a plurality of cameras coupled to said vest, said cameras being operationally coupled to said microprocessor, wherein said cameras are positioned on said vest such that said cameras are configured for capturing video recordings of events in the area proximate to said vest, said plurality of cameras being positioned on said collar of said vest, said plurality of cameras comprising four said cameras evenly distributed around said collar;

a data storage module coupled to said vest, said data storage module being operationally coupled to said microprocessor, wherein said data storage module is positioned on said vest such that said data storage module is positioned for receiving and storing the audio and visual recordings;

a transceiver coupled to said vest, said transceiver being operationally coupled to said microprocessor, wherein said transceiver is positioned on said vest such that said transceiver is configured for sending the audio and visual recordings to one or more recipients, and wherein said transceiver is positioned for receiving an audio signal and relaying the audio signal to said microprocessor;

a receiver coupled to said vest, said receiver being global positioning system enabled, said receiver being operationally coupled to said microprocessor, wherein said receiver is positioned on said vest such that said receiver is configured for receiving coordinates of the user and relaying the coordinates to said microprocessor, wherein said microprocessor is positioned for compelling said transceiver for sending the coordinates of the user to the one or more recipients;

a plurality of speakers coupled to said vest, said speakers being operationally coupled to said microprocessor, wherein said speakers are positioned on said vest such that said speakers are configured for broadcasting the audio signal relayed by said microprocessor from said transceiver to the area proximate to said vest, said plurality of speakers being positioned on said collar of said vest, said plurality of speakers comprising two said speakers positioned singly on said front and said back of said vest;

a plurality of first lights coupled to said vest, said first lights being operationally coupled to said microprocessor, wherein said first lights are positioned on said vest such that said first lights are configured for increasing visibility of the user to persons proximate to the user, said plurality of first lights comprising a plurality of sets of first light emitting diodes, said plurality of sets of first light emitting diodes comprising a set of first light emitting diodes positioned proximate to a perimeter of said bottom of said vest, two sets of first light emitting diodes positioned singly proximate to each front shoulder of said vest, and a set of first light emitting diodes positioned on a back of said vest configured in script;

a plurality of first panels, said first panels being reflective, each said first panel being coupled to said vest such that said first panel is positioned between a respective said set of first light emitting diodes and said vest, wherein said first panels are positioned on said vest such that said first panels are configured for increasing the visibility of the user to persons proximate to the user;

a pair of sleeves, each said sleeve being coupled to and extending from a respective arm hole of said vest, wherein said sleeves are positioned on said vest such that said sleeves are configured for inserting arms of the user;

a plurality of second lights coupled to said sleeves, said second lights being operationally coupled to said microprocessor, wherein said second lights are positioned on said sleeves such that said second lights are configured for increasing the visibility of the user to persons proximate to the user, said plurality of second lights comprising a plurality of sets of second light emitting diodes, said plurality of sets of second light emitting diodes comprising two sets of second light emitting diodes positioned singly proximate to each respective cuff of said sleeves, and two sets of second light emitting diodes positioned singly on each respective outer surface of said sleeves;

a plurality of second panels, said second panels being reflective, each said second panel being coupled to a respective said sleeve such that said second panel is positioned between a respective said set of second light emitting diodes and said respective said sleeve, wherein said second panels are positioned on said sleeves such that said second panels are configured for increasing the visibility of the user to persons proximate to the user;

a switch coupled to said front of said vest, said switch being operationally coupled to said first power module and said microprocessor, wherein said switch is positioned on said vest such that said switch is configured for manipulating by the user for selectively coupling said microprocessor to said first power module;

a first pocket positioned on said front of said vest, said first pocket being configured for positioning a taser;

a hole positioned in said first pocket, wherein said hole is positioned in said first pocket such that said hole is configured for inserting a push button of the taser positioned in said first pocket;

a pair of second pockets positioned on said front proximate to said bottom of said vest, wherein said second pockets are positioned on said vest such that said second pockets are configured for stowing items and inserting hands of the user;

a pair of buttons coupled singly proximate to said second pockets, each said button being operationally coupled to said microprocessor and said first power module, wherein said buttons are positioned on said vest such that each said button is configured for depressing for compelling said microprocessor for intermittently activating said plurality of first lights and said plurality of second lights for strobing;

a coupler coupled to said vest, said coupler being configured for reversibly coupling to a nightstick, said coupler being positioned on a respective side of said vest proximate to said bottom of said vest;

a pair of pants complementary to said vest, said pants being configured for positioning on and coupling to the user such that said pants extend from said bottom of said vest to proximate to ankles of the user;

a second power module coupled to said pants proximate to a waistband of said pants, said second power module comprising at least one second battery, said at least one second battery being rechargeable;

a second port coupled to said pants proximate to said at least one second battery, said second port being operationally coupled to said at least one second battery, wherein said second port is positioned on said pants such that said second port is configured for recharging said at least one second battery, said second port comprising a second universal serial bus port, said second universal serial bus port being fast-charging;

a plurality of third lights coupled to said pants, wherein said third lights are positioned on said pants such that said third lights are configured for increasing the visibility of the user to persons proximate to the user, said plurality of third lights comprising a plurality of sets of third light emitting diodes, said plurality of sets of third light emitting diodes comprising two sets of third light emitting diodes positioned singly proximate to each respective bottom edge of legs of said pants, two sets of third light emitting diodes positioned singly on each respective outer face of said legs configured in script, two sets of third light emitting diodes positioned singly on a front face of said pants and extending from proximate to said waistband toward a respective said outer face, and a set of third light emitting diodes positioned on a backside of said pants proximate to said waistband;

a plurality of third panels, said third panels being reflective, each said third panel being coupled to said pants such that said third panel is positioned between a respective said set of third light emitting diodes and said pants, wherein said third panels are positioned on said pants such that said third panels are configured for increasing the visibility of the user to persons proximate to the user;

a pair of gloves complementary to said vest, each said glove having an opening such that said gloves are configured for positioning singly on and coupling to the hands of the user such that said gloves cover the hands of the user;

a pair of third power modules coupled singly to said pair of gloves proximate to said openings, each said third power module comprising at least one third battery, said at least one third battery being rechargeable;

a pair of third ports, each said third port being coupled to a respective said glove proximate to said at least one third battery, said third port being operationally coupled to said at least one third battery, wherein said third port is positioned on said respective said glove such that said third port is configured for recharging said at least one third battery, said third port comprising a third universal serial bus port, said third universal serial bus port being fast-charging;

a plurality of fourth lights coupled to said gloves, wherein said fourth lights are positioned on said gloves such that said fourth lights are configured for increasing the visibility of the user to persons proximate to the user, said plurality of fourth lights comprising a plurality of sets of fourth light emitting diodes, said plurality of sets of fourth light emitting diodes comprising sets of fourth light emitting diodes positioned singly proximate to ends of each digit tube and each thumb tube of each said glove, and two sets of fourth light emitting diodes positioned singly on each respective upper face of said gloves configured in script;

a plurality of fourth panels, said fourth panels being reflective, each said fourth panel being coupled to a respective said glove such that said fourth panel is positioned between a respective said set of fourth light emitting diodes and said respective said glove, wherein said fourth panels are positioned on said gloves such that said fourth panels are configured for increasing the visibility of the user to persons proximate to the user; and wherein said microphones are positioned on said vest such that said microphones are configured for capturing audio recordings of events in the area proximate to said vest, wherein said cameras are positioned on said vest such that said cameras are configured for capturing video recordings of events in the area proximate to said vest, wherein said data storage module is positioned on said vest such that said data storage module is positioned for receiving and storing the audio and visual recordings, wherein said transceiver is positioned on said vest such that said transceiver is configured for sending the audio and visual recordings to the one or more recipients, and wherein said transceiver is positioned for receiving the audio signal and relaying the audio signal to said microprocessor, wherein said receiver is positioned on said vest such that said receiver is configured for receiving the coordinates of the user and relaying the coordinates to said microprocessor, wherein said microprocessor is positioned for compelling said transceiver for sending the coordinates of the user to the one or more recipients, wherein said speakers are positioned on said vest such that said speakers are configured for broadcasting the audio signal relayed by said microprocessor from said transceiver to the area proximate to said vest, wherein said first lights are positioned on said vest, said second lights are positioned on said sleeves, and said third lights are positioned on said pants such that said first lights, said second lights, and said third lights are configured for increasing the visibility of the user to persons proximate to the user.

\* \* \* \* \*